Sept. 13, 1960     M. BURGER ET AL     2,952,199
AUTOMATIC REGULATOR FOR LENS DIAPHRAGMS
Filed March 14, 1955     3 Sheets-Sheet 1

MICHAEL BURGER &
ERICH BURGER
       INVENTORS

BY

THEIR ATTORNEYS

Sept. 13, 1960      M. BURGER ET AL      2,952,199
AUTOMATIC REGULATOR FOR LENS DIAPHRAGMS
Filed March 14, 1955      3 Sheets-Sheet 2

MICHAEL BURGER &
ERICH BURGER
          INVENTORS

BY

THEIR ATTORNEYS

MICHAEL BURGER &
ERICH BURGER
INVENTORS

United States Patent Office 2,952,199
Patented Sept. 13, 1960

2,952,199

AUTOMATIC REGULATOR FOR LENS DIAPHRAGMS

Michael Burger and Erich Burger, both of Pognerstrasse 2, Munich 25, Germany

Filed Mar. 14, 1955, Ser. No. 494,198

Claims priority, application Germany Oct. 21, 1949

Public Law 619, Aug. 23, 1954
Patent expires Oct. 21, 1969

20 Claims. (Cl. 95—64)

This invention relates to photographic apparatus and particularly relates to automatic regulator means for regulating a lens diaphragm in a photographic apparatus, such as a camera, in accordance with ambient illumination. Even more specifically, the invention relates to an exposure control mechanism which is directly responsive to the movement of a conventional galvanometer type light-sensitive indicator.

It has been previously known to use galvanometer actuated regulators for lens diaphragms which comprise a stop means adapted to be actuated by the galvanometer into a position limiting the movement of the adjusting member for the diaphragm. All such previous constructions, however, had many defects, among which was the fact that the ordinary commercially available diaphragms could not be used, but specially constructed diaphragms were required. Furthermore, in these previous type devices, there was a continuous movement of the diaphragm even during constant light conditions. There was, therefore, constant pressure on the fragile galvanometer needle which often caused it to break. In the same manner, the galvanometer was hindered in its movement by the stop for such a length of time that it was difficult for it to subsequently re-balance itself when the stop means was removed. In addition to all the other disadvantages, it was impossible to obtain a precision movement unless a large number of precision parts were employed. Since great precision in such a device is highly important, especially in regard to color and motion picture cameras, this was a serious defect.

It is, therefore, one object of the present invention to provide an automatic regulator device for photographic lens diaphragms which can be used in conjunction with commercially available diaphragms.

Another object of the present invention is to provide a galvanometer-type regulator means for photographic lens diaphragms wherein there is no continuous pressure on the galvanometer needle.

Another object of the present invention is to provide an automatic galvanometer-actuated regulator for photographic lens diaphragms which permits the diaphragm to remain stationary during constant light conditions.

Another object of the present invention is to provide an automatic regulator for photographic lens diaphragms which requires very few parts and where great precision is not absolutely necessary.

Other objects of the present invention will become apparent from the description and claims which follow, in which:

Figure 1:
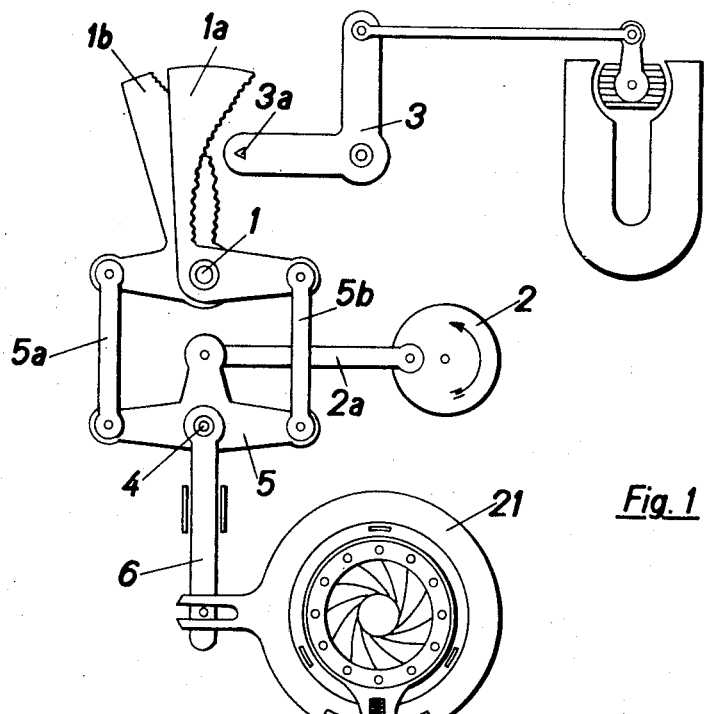
Fig. 1 is a generally schematic view of a mechanism embodying the present invention.

Referring now in greater detail to the drawings wherein similar reference characters refer to similar parts, there is shown in Fig. 1 a pair of levers 1a, 1b which are coaxially mounted for rotation on a pivot shaft 1. The lever 1a has a serrated concave edge, while the lever 1b is provided with a serrated convex edge. Each of the levers 1a, 1b is provided with an offset arm extending in opposite directions beyond the pivot shaft 1. The offset arm of the lever 1a is connected to the lower lever 5 by a pivoted link 5b. The lever 5 is provided with a centrally upstanding lug to which is connected a crank arm 2a which is eccentrically connected to a rotatable disc 2. The disc 2 may be actuated by the conventional film driving mechanism, if the device is used in a motion picture camera, or it may be actuated for a single rotation by the shutter release mechanism of a still camera.

Pivotally connected to the central portion of the lever 5, as at the pivot point 4, is a rod 6 which is vertically reciprocable between a pair of guide members. The rod 6 is provided with a pin at the lower portion thereof, this pin being movable within a slot formed in the actuating arm of a diaphragm ring 21. This ring 21 is of the type which permits the use of various sized diaphragms because, since the size of the ring itself is constant, any sized diaphragm may be inserted within the ring and yet be actuated by the ring by means of a spring pressed ball and socket arrangement. A series of sockets may be provided on the ring such as shown at 22a—22c, so that the diaphragm may be adjustably connected thereto according to the desired light sensitivity or the desired camera speed.

A centrally pivoted L-shaped lever 3 is provided adjacent the levers 1a and 1b. One end of the lever 3 is connected by suitable linkage to the galvanometer, while the opposite end of the lever is provided with a wedge-shaped stop 3a.

The pivotal position of the stop 3a depends upon the amount and direction of movement of the light-actuated galvanometer. The levers 1a and 1b are actuated by the crank arm 2a which exerts its force through the lever 5 and the linkage 5a and 5b. The two levers 1a and 1b are, meanwhile, so formed that the total path that they must travel to the stop remains constant for each position of the stop. On the other hand, the two levers may be displaced relatively to each other to an extent which depends upon the position of the stop 3a. As long as the stop 3a always contacts the two oppositely curved levers at the same predetermined position, no displacement between the levers takes place. When this is the case, the rod 6 remains stationary and the diaphragm is not actuated.

If, however, the lever 3 is actuated by the light-sensitive galvanometer to move the stop 3a to a different position wherein the two levers 1a and 1b do not contact the stop at the same time, one of the levers will be moved for a distance further than the other lever and there will be a corresponding longitudinal displacement of the rod 6. This will cause the diaphragm ring 21 to rotate and to thereby either close or open the diaphragm, depending on the direction of rotation.

Figure 2:
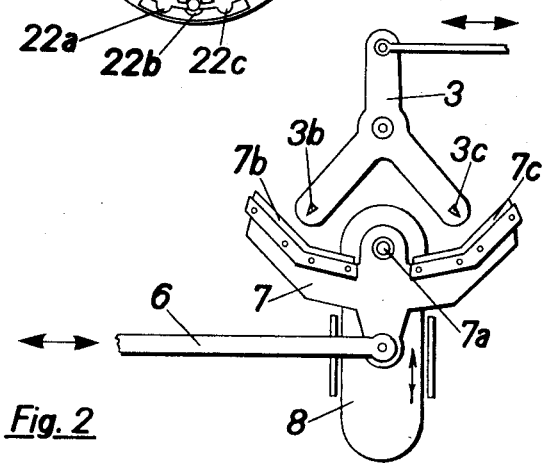
Figs. 2 to 7 show fragmentary schematic views of various other embodiments of the present invention.

In Fig. 2 an embodiment of the invention is shown wherein a fork-shaped lever 3 is substituted for the lever 3 of the first embodiment. The two forked arms of the lever 3 in Fig. 2 are each provided with a wedge-shaped, knife edge as at 3b and 3c. These knife edges 3b and 3c are each adapted to be positioned on a resilient pad, such as shown at 7b and 7c. Each of these pads is mounted upon an oppositely extending arm of a lever 7 which is pivoted at 7a on a reciprocable plate 8. A diaphragm actuating rod 6 has a pivotal connection with a lug extending from the bottom of the lever 7, and is connected at its other end to the diaphragm ring, not shown. The plate 8 is vertically reciprocated between a pair of guide members by a reciprocating means which is, for example, any well known conventional reciprocating means. The device of Fig. 2 works similarly to that of Fig. 1 in that, as the plate 8 moves upwardly, it carries the lever 7 along with it. If each arm of the lever 7 contacts the knife edges 3b and 3c simultaneously, there is no adjustment of the diaphragm. However, if the stop lever 3 is rotated to such a position that one of the knife edges is lower than the other, the lower knife edge will be contacted first by the lever 7, and there will be continued movement of the other portion of the lever until the other knife edge is contacted. This will cause the rod 6 to actuate the diaphragm ring for the purpose of adjusting the diaphragm to the appropriate position.

Figure 3:
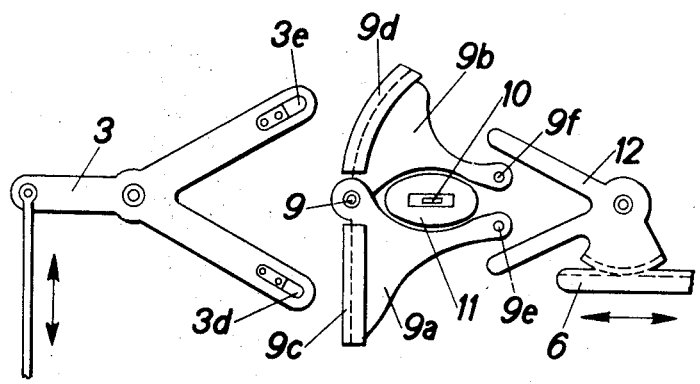

In Fig. 3, there is shown a modification wherein the stop lever 3 is provided with a pair of forked arms similar to that shown in Fig. 2. At the end of each of the forked arms there is provided a tongue, such as shown at 3d and 3e. A pair of levers 9a and 9b are coaxially pivoted on a pivot shaft 9. The lever 9a is provided with a resilient pad 9c on the surface thereof and the lever 9b is similarly provided with a resilient pad 9d. The levers 9a and 9b are simultaneously actuated toward the stops 3d and 3e by means of an elliptically shaped disc 11 having an opening in the center thereof through which projects a flat driving rod 10. As the disc 11 rotates, the pad-covered faces of the levers 9a and 9b are moved toward or away from the stop members 3d and 3e. If the stop lever 3 is in the normal position, the pads 9c and 9d will simultaneously contact the stops 3d and 3e. However, if the lever 3 has been rotatably adjusted on its pivot by means of the galvanometer, one of the stop members, either 3d or 3e, will be closer to its corresponding lever than the other stop member. As a result, one of the levers will have to travel further around its pivot 9 than the other in order to have its corresponding padded edge contact its corresponding stop. This causes the narrow arm of the lever, to which is attached either pin 9e or 9f, to move the respective arm of the V-shaped lever 12. This means that the lever 12 will be rotated in one direction and this will cause the teeth of a sector type pinion, connected to the lever 12, to actuate a rack 6. This rack 6 is, in turn, connected to the diaphragm ring, not shown. It should be noted that the lever 9a is provided with a relatively straight face, while the lever 9b has a curved face. This construction is provided in order to compensate for the logarithmic distribution of the diaphragm openings.

Figure 4:
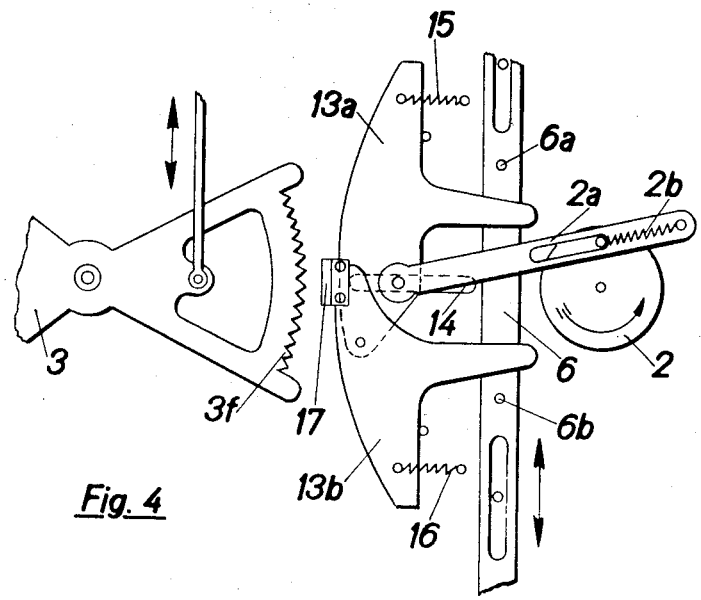

The modification of Fig. 4 shows a pivoted stop lever 3 which is provided with a toothed sector 3f disposed between a pair of protuberances. There is also provided a pair of levers 13a and 13b which are pivoted to each other. At the area where the surfaces of the two levers meet, a resilient bumper 17 is provided. A rod 2a is pivotally connected to the lever 13a and is provided with a pin which is movably guided with a slot 14 in the housing of the camera. The rod 2a is actuated by a rotatable disc having an eccentrically mounted pin which projects into an elongated slot in the rod 2a. The pin is biased toward the end of the slot by a spring 2b mounted on the rod 2a. A pair of springs 15 and 16 resiliently urge each of their respective levers 13a and 13b around a corresponding pivot pin extending from the housing to a position behind the levers. These springs urge the bumper 17 toward initial contact against the toothed segment 3f, the teeth of the segment 3f becoming embedded in the resilient material of the bumper to provide a firm engagement. Each lever 13a and 13b is provided with a rearwardly extending arm which is adapted to contact a pin 6a or 6b mounted on a rod 6 which is connected to the diaphragm ring, not shown. The rod 6 will not move unless one of the levers 13a, 13b strikes its respective protuberance of lever 3 first, in which case the other lever will be forced to move further in order to make contact and in doing so, will apply force against the corresponding pin 6a or 6b to move the lever 6.

Figure 5:
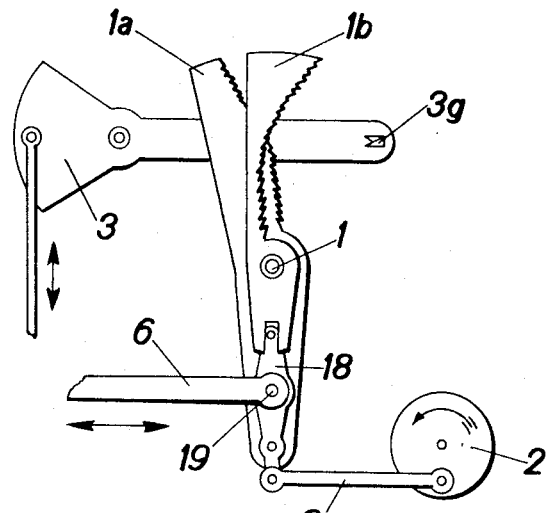
Figures 6, 7:
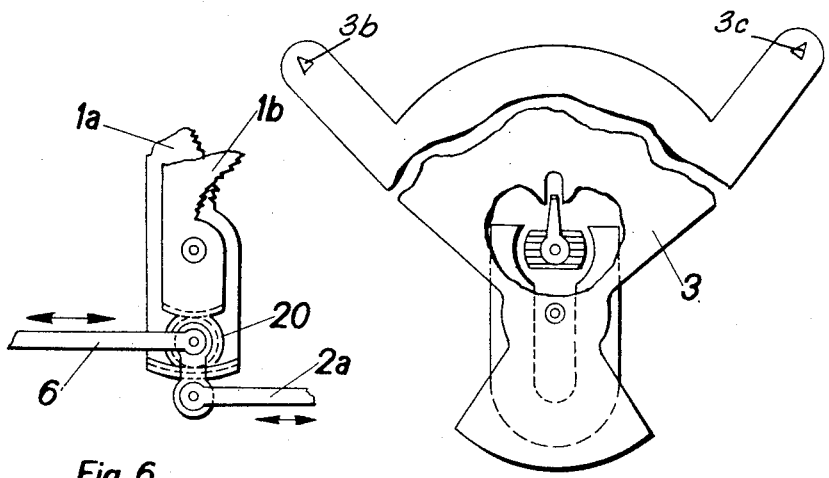

Fig. 5 shows a further modification wherein a pair of levers 1a and 1b, similar to those shown in Fig. 1, are provided. The levers 1a and 1b are coaxially mounted for pivotal movement on a shaft 1. A slot is formed in the bottom of lever 1b and is adapted to receive a pin on a pivotally mounted tilting lever 18, which is connected at its other end to the other of said levers 1a. The lever 18 is pivotally connected to a driving disc 2 by an eccentrically positioned crank arm 2a. A stop lever 3 is provided with a tongue 3g which acts as a stop for the levers 1a, 1b in similar manner to the embodiment of Fig. 1. The levers 1a, 1b are moved by the reciprocating lever 18 which is actuated by the crank arm 2a. A diaphragm actuating rod 6 is pivotally connected to the lever 18 and is actuated by the levers 1a and 1b in accordance with the position of the stop 3 similar to the device of Fig. 1. It should be noted that the diaphragm provides a substantially greater resistance to displacement than do the levers 1a and 1b. The pivot pin 19 can, therefore, only be displaced if the position of the stop 3 is changed by the galvanometer, and as a result, one of the two levers 1a, 1b is more limited in its path than the other. The locking teeth on the levers 1a, 1b are so constructed that they lock against the tongue 3g on the side corresponding to the contour of the lever so that they may only be released by opposite movement of the levers. In Fig. 6, a device similar to that in Fig. 5 is shown. However, a toothed wheel 20 is substituted for the tilting lever 18, and the oppositely positioned teeth of this wheel mesh with toothed segments formed on the levers 1a, 1b.

In Fig. 7, there is shown a practical embodiment of a connection between the galvanometer and the stop lever 3. In this case, the pointer of the galvanometer extends within a slot in the face of the lever so that as the pointer rotates, it will rotate the lever 3 directly with it. This arrangement provides an efficient connection wherein there is no necessity for employing precision type intermediate linkage.

Although the mechanism described above has been illustrated as applied to the regulation of a diaphragm, it may also be used to regulate the shutter speed of a camera. Obviously, many modifications and variations of the present invention are possible in the light of the above teachings. It is, therefore, to be understood that within the scope of the appended claims, the invention may be practiced otherwise than as specifically described.

What is claimed is:

1. An automatic device for controlling an exposure-regulating element of a photographic apparatus comprising a galvanometer including a movable element, stop means movably mounted adjacent said movable element, coupling means connecting said stop means to said movable element for adjusting the position of said stop means in accordance with the ambient illumination, a detecting means including a pair of arms rotatably mounted adjacent said stop means, said stop means and said pair of arms being constructed and arranged to contact each other at a point upon each of said arms which causes the orientation of said arms to vary in accordance with the position of said movable element, a cyclic driving means, actuating means connecting said arms with said driving means for moving each of said arms into periodic contact with said stop means, linking means connecting said arms with said exposure-regulating element, and said linking means being constructed and arranged to transmit movement to said exposure-regulating element only when said orientation of said arms varies and one of said arms contacts said stop means before the other of said arms contacts said stop means thereby holding said exposure-regulating element motionless when there is no change in the ambient illumination.

2. An automatic device as set forth in claim 1 wherein said driving means includes a crank means.

3. An automatic device as set forth in claim 2 wherein said linking means comprises a connecting rod.

4. An automatic device as set forth in claim 1 wherein said stop means is rotatably mounted, and said stop means and said arm are constructed and arranged with surfaces which prevent relative slippage after contacting each other.

5. An automatic device as set forth in claim 1 wherein said arms are rotatably mounted relative to each other, and said linking means is constructed and arranged to transmit movement to said exposure-regulating element only when one of said arms contacts said stop means before the other of said arms contacts said stop means.

6. An automatic device as set forth in claim 5 wherein the surfaces of said arms are serrated, and said stop means includes a pointed end which engages said serrations.

7. An automatic device as set forth in claim 6 wherein one of said arms is convexly curved, and the other of said arms is concavely curved.

8. An automatic device as set forth in claim 5 wherein said linking means comprises a parallelogram type linkage.

9. An automatic device as set forth in claim 1 wherein said arms are rigidly joined to each other, and said stop means includes a pair of stop elements disposed in the path of movement of each of said arms.

10. An automatic device as set forth in claim 9 wherein said rigidly connected arms are rotatably mounted upon a reciprocating element.

11. An automatic device as set forth in claim 1 wherein said arms are rotatably mounted about a pivot point, said driving means comprises an eccentric, said arms include extensions surrounding said eccentric, said stop means includes a pair of projections disposed adjacent said arms of said detecting means, and said linking means includes projection and lever means connecting said arms with said exposure-regulating element.

12. An automatic device as set forth in claim 11 wherein one of the faces of said arms is curved and the other of said arms is substantially straight to compensate for the logarithmic distribution of corresponding diaphragm openings.

13. An automatic device as set forth in claim 1 wherein said stop means includes an arcuate segment disposed between a pair of protuberances, said arms include a pair of arms rotatably secured to each other, a reciprocating means is connected to said arms, said driving means is operatively connected to said reciprocating means, and said arms are constructed and arranged to include a common point which contacts said arcuate segment, and the extremities of said arm are constructed and arranged to contact respective protuberances after said common point contacts said segment.

14. An automatic device as set forth in claim 13 wherein said arcuate segment is serrated, and an elastic element is mounted at said common point of said arms to firmly contact said serrated segment without slippage.

15. An automatic device as set forth in claim 13 wherein said arms include extensions, a rod is disposed across the path of travel of said extension, and projection and lever means connects said extensions with said rod to transmit variations in the orientation of said arms to said exposure-regulating element.

16. An automatic device as set forth in claim 1 wherein said arms are rotatably mounted about a common pivot, a rotatable element having an axis of rotation connects said actuating means with said arms, and said linking means connects said axis of rotation of said rotatable element with said exposure-regulating element.

17. An automatic device as set forth in claim 16 wherein said rotatable element is comprised of a lever, one end of said lever is connected with one of said arms by means of a tongue and slot connection, and the other end of said lever is connected to said other arm by a pivot means.

18. An automatic device as set forth in claim 16 wherein said rotatable element is comprised of a circular gear, and said circular gear is connected with said arms by means of curved racks attached to said arms.

19. An automatic device as set forth in claim 16 wherein said linking means and said exposure-regulating element are constructed and arranged to provide a higher frictional resistance than said arms to permit said axis of rotation to be displaced only when said orientation of said stop means varies.

20. An automatic device as set forth in claim 1 wherein said coupling means connecting said stop means to said movable element is comprised of projection and slot means.

References Cited in the file of this patent
UNITED STATES PATENTS

| | | |
|---|---|---|
| 2,148,963 | Rauch | Feb. 28, 1939 |
| 2,388,609 | Ericsson | Nov. 6, 1945 |
| 2,838,985 | Burger et al. | June 17, 1958 |